A. PRIBIL.
AUTOMATIC LUBRICATING DEVICE.
APPLICATION FILED JULY 5, 1911.

1,008,061.

Patented Nov. 7, 1911.

Witnesses:
Geo. T. Pinckney
E. Zachariasen

Inventor:
Adolphe Pribil
By Harold Serrell
his Attorney.

UNITED STATES PATENT OFFICE.

ADOLPHE PRIBIL, OF PARIS, FRANCE.

AUTOMATIC LUBRICATING DEVICE.

1,008,061.

Specification of Letters Patent.  Patented Nov. 7, 1911.

Application filed July 5, 1911. Serial No. 636,951.

*To all whom it may concern:*

Be it known that I, ADOLPHE PRIBIL, a citizen of the French Republic, residing at 43 Rue de Caumartin, Paris, France, have invented certain new and useful Improvements in Automatic Lubricating Devices, of which the following is a specification.

My invention relates to an automatic lubricating device comprising an oscillating member which is under the action of springs and serves as the closure member for the oil duct.

In well-known lubricating devices of the type described the closure member is either a ball which has to perform lifting work during its movement, or a cylindrical body which is mounted in a hollow cylinder and is rotated by the pendulum in the said cylinder. As the entire surface of the cylindrical closure member is displaced relatively to the entire inner surface of the outer cylinder a considerable portion of the impulse energy is lost at the walls owing to friction. Known lubricating devices of this type are therefore employed only for reciprocating parts of machines in which the pendulum is swung over alternately toward both sides by the severe rhythmical impulses of the machine and periodically opens the oil duct.

Now a primary object of my invention is to provide a closure member which is not only of a new form and mounted in a new manner, but produces, instead of the sliding friction in the known devices, the considerably smaller rolling friction and thereby admits of utilizing the entire impulse or shaking energy which is at disposal for moving the closure member. To this end, I shape the bottom end of the closure member, upon which it rests freely on its support, in the form of a roller, in consequence of which shape it executes roller-like movements on its support when the pendulum oscillates.

Two illustrative embodiments of my invention are represented by way of example in the accompanying drawing, wherein:—

Figure 1:
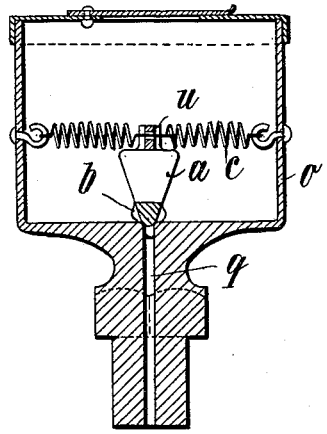
Figure 2:
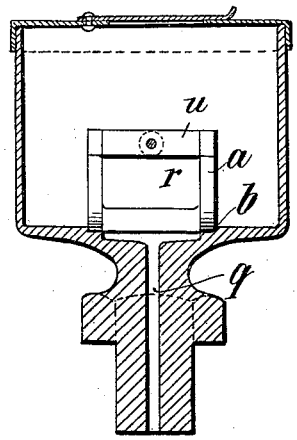
Figure 3:
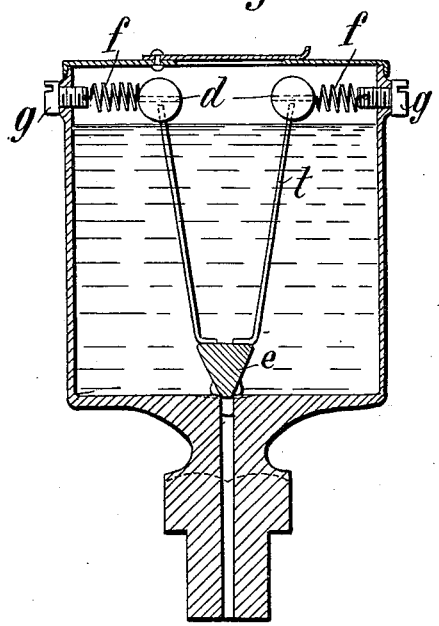
Figure 4:
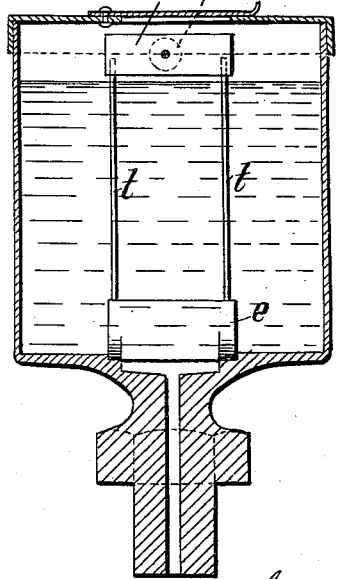

Figures 1 and 2 are vertical sections in two planes at right angles to one another showing one form, and Figs. 3 and 4 are like views showing the second form.

Referring to Figs. 1 and 2, the closure member $a$ is wedge-shaped and thickened at $b$ in the form of a roll at its bottom end. Preferably, it is made somewhat broader than the oil duct $q$ under it, the roll-like thickened portion $b$ being provided at the ends thereof, in order to obtain a continuous support for the roll-like movement. (See Fig. 2). It may be recessed in the middle at $r$. It carries a weight $u$ on its upper end, and is held in or returned into its normal position by coil springs $c$ attached to the oil vessel $o$.

Referring now to Figs. 3 and 4, the closure member $e$ again has the shape of a wedge. In order as much as possible to diminish the resistance to motion in the liquid, the weights $d$ are connected by thin rods $t$ with the wedge-shaped member and are located above the liquid. The springs $f$ holding the wedge-shaped member in its normal position are connected with screws $g$ whereby the tension of the springs can be adjusted to regulate the oscillation and effect a return of the closure member to its normal position and so control the consumption of oil.

When the machine is driven the entire pendulum oscillates and the closure member opens the oil duct and allows the lubricant to flow therethrough.

Owing to friction being reduced to a minimum in this form of the device according to my invention the impulse or shaking energy at disposal can be fully utilized. This is aided by the closure member not having to perform any lifting work.

Without departing from the scope of the invention the closure member may, of course, be shaped otherwise than as described and shown.

I claim:—

1. In a lubricating device the combination of a vessel, a closure member therein, the bottom end of which rests freely on its support and is shaped in the form of a roller, and a weight at the upper end of said closure member and yieldingly held for normally closing an oil duct under the said member.

2. In a lubricating device the combination of a vessel, a closure member therein, the bottom end of which rests freely on its support and is shaped at both sides in the form of rollers, and a weight at the upper end of said closure member which is yieldingly held for normally closing an oil duct under the said member and between the said rollers.

3. In a lubricating device the combination of a vessel, a wedge-shaped closure member therein, the bottom end of which rests freely on its support and is in the form of a roller, and one or more weights at the upper end of said closure member which is yieldingly held for normally closing an oil duct under the said member.

4. In a lubricating device the combination of a vessel, a wedge-shaped closure member therein, the bottom end of which rests freely on its support and is shaped at both sides in the form of rollers, and one or more weights connected to the upper end of the closure member which is yieldingly held for normally closing an oil duct under the said member and between the said rollers.

5. In a lubricating device the combination of a vessel, a closure member therein for normally closing an oil duct, the bottom end of the closure member resting freely on its support and adapted to rock thereon, and means for closing and yieldingly holding said closure member in its normal position.

In witness whereof, I have hereunto signed my name in the presence of two subscribing witnesses.

ADOLPHE PRIBIL.

Witnesses:
JEAN KLOCK,
CHARLES HUDELET.